July 20, 1965
A. J. GIGER
3,196,359
WIDE BAND CURRENT LIMITER
Filed Dec. 11, 1962
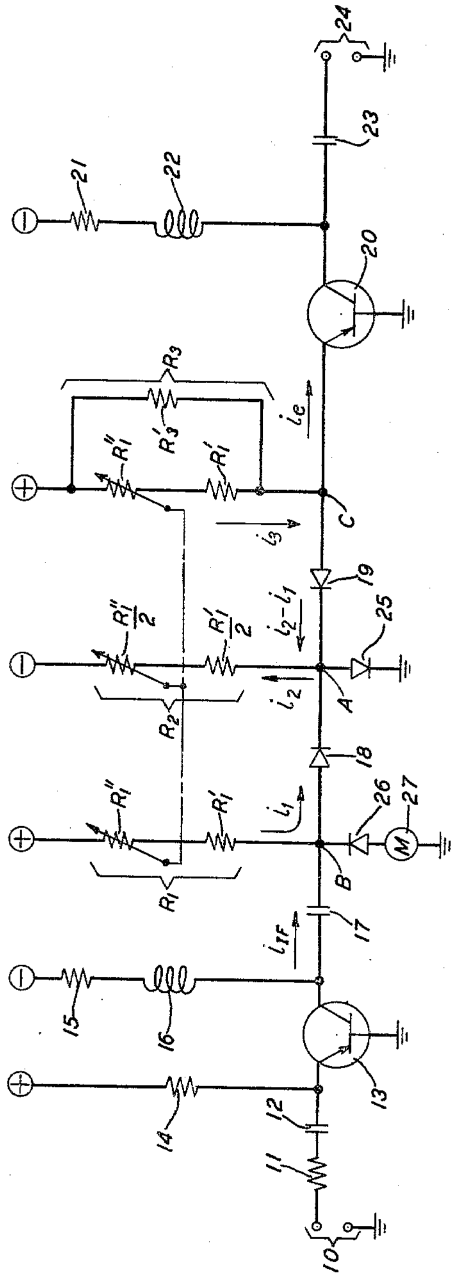
INVENTOR
A. J. GIGER
BY
G. E. Hirsch Jr.
ATTORNEY 3,196,359

WIDE BAND CURRENT LIMITER

Adolph J. Giger, Murray Hill, N.J., assignor to Bell Telephone Laboratories, Incorporated, New York, N.Y., a corporation of New York Filed Dec. 11, 1962, Ser. No. 243,901
2 Claims. (Cl. 328—168)

This invention relates to frequency modulation transmission systems and more particularly to circuits used in such systems for limiting any amplitude modulated components which may be impressed on the frequency modulated signal.

One of the principal concerns in the design of long range communication systems involves the recovery of modulated signals of relatively low level from a relatively high level of background noise. This noise may result from sources either external to or within the receiver apparatus. The problem is of paramount importance, for example, in over the horizon communication systems, in systems employing space satellites as terminal or repeater stations, and in other broad-band, high frequency systems in which the power available in the modulated signal supplied to the receiver is of a very low order of magnitude. It is well known, of course, that the detection threshold of the receiver used to recover high-index frequency modulation signals may be appreciably improved by using an FM discriminator circuit with feedback. This form of demodulator is described in J. G. Chaffee Patent 2,075,503, granted March 30, 1937. Even with the increase in the signal-to-noise ratio of the demodulated signal obtained with a detector of this form, signal delays in the individual circuits which make up the demodulator, or in combintions of them, may severely limit the bandwidth which can be accommodated by the demodulator. The circuits used in the demodulator, therefore, should exhibit as much signal gain with as little signal delay as possible, and this must hold true over a very wide band of frequencies.

Any amplitude modulation present on a received frequency modulation signal constitutes undesirable noise and is usually responsible for unwanted distortion in the discriminator. Consequently, a limiting device is normally used in conjunction with the demodulation process, e.g., in the feedback loop of the discriminator with feedback discussed above, to restrict amplitude variations in the signal prior to the detection of frequency variations. Thus, the limiter device functions essentially to reduce the index of amplitude modulation of the input signal. The function is called "limiting," or AM suppression and the amount of limiting is the ratio of the index of amlitude modulation in the output signal to the index of amplitude modulation of the input signal. When operated at frequencies in the tens of megacycles per second, the limiter must accordingly have high efficiency and extremely low signal delay.

It is the principal object of this invention to achieve a high limiting ratio, high efficiency, and low signal delay in a wide band limiter. It is another object of the invention to eliminate amplitude modulation components from a wide band frequency modulated signal with no appreciable conversion of amplitude information to phase information.

In accordance with the above objects, extremely wide band operation is achieved by passing frequency modulated currents from an untuned, high impedance current source through a tandem arrangement of oppositely poled unilaterally conducting elements such as diodes connected in the "series" limiter configuration. With proper biasing, the series limiter acts as a current gate to restrict amplitude excursions beyond preselected magnitudes of signals of either polarity. The low impedance requisite for wide band, low delay operation is achieved by mating the series limiter arrangement with an untuned impedance buffer such as a transistor in the grounded base configuration. This, together with a complete avoidance of tuned circuits of any kind, is responsible for extremely low amplitude-to-phase conversion.

To maintain a nearly constant impedance condition in the series connection of diodes, auxiliary shunt diode circuits are employed which act as temporary current paths, e.g., to ground, for applied signal currents when one of the series diode elements opens to limit peak excursions. Further, in accordance with the invention, provision is made for symmetrically altering the clipping level of applied frequency modulated currents without appreciably altering the bandwith or delay characteristics of the circuit. This is done by simultaneously altering the bias condition of both of the series limiter diodes and the associated impedance buffer.

These and other objects and features of the present invention, and the nature of the invention and its advantages, will appear more fully upon consideration of the illustrative embodiment shown in the accompanying drawing and the following detailed description.

Frequency modulated signal currents from an intermediate frequency amplifier or the like external to the limiter circuit shown in the figure, are supplied to terminals 10 of the limiter apparatus. The limiter circuit shown in the drawing serves to remove those amplitude variations which may be impressed on them. Applied IF currents are thus passed by way of impedance matching resistor 11 and coupling capacitor 12 to the emitter of transistor 13. Transistor 13, which acts as a driver amplifier, is connected in the grounded base configuration, and has as its emitter biased by way of resistor 14 and a suitable source of positive potential. Its collector is biased by and decoupled from a negative potential source by resistor 15 and inductor (choke) 16. Signal currents from the collector of amplifier 13 are supplied by way of coupling capacitor 17 and oppositely poled, unilaterally conducting devices 18 and 19, which may be for example, fast acting silicon, point contact, diodes, to the emitter of transistor 20, also connected in the grounded base configuration. Transistor 20, which serves as a buffer amplifier to couple the limited signal currents to a utilization circuit such as a frequency discriminator is forward biased by a constant current $i_e$. The impedance between the emitter and base (ground) of transistor 20 is a function of $i_e$ and is never more than a few ohms; typically, two ohms. Consequently, the voltage across this low impedance, e.g., between point C and ground in the drawing, is never higher than a few tenths of a volt for signals ordinarily encountered in practice. The emitter of transistor 20 is biased by resistor $R_3$ connected to a point of positive potential, and its collector is biased by current from a negative potential source and resistor 21 and inductor 22. Limited signal currents developed at the collector of transistor 20 are supplied by way of coupling capacitor 23 to output terminals 24.

Diode 18 is normally forward biased by current $i_1$ supplied from a positive bias potential by way of resistor $R_1$, and diode 19 is normally forward biased by current $i_2—i_1$ returned to a negative bias source by way of resistor $R_2$. Hence, diodes 18 and 19 conduct fully during the nonclipping phase of their operation. Since the forward biased diodes exhibit a very low impedance, they are responsible for only a very low voltage drop. The voltages at points A and B are thus about equal to the voltage at point C, namely, a few tenths of a volt above ground. As soon as an incoming IF signal is sufficiently strong to produce a current $i_{IF}$ at the collector of driver amplifier 13 which exceeds the bias current $i_1=i_2-i_1$ in the positive direction, diode 19 is cut off. The excess IF current is prevented from causing an impedance unbalance by a temporary shunt path created for it. Diode 25, connected between point A and ground, is normally reverse biased, i.e., is nonconducting, during the nonclipping phase, by virtue of a slight negative bias. This is necessary since the potential at point A during the nonclipping phase could be below the voltage at point C and might even be slightly (a few tenths of a volt) positive. Preferably a diode with a built-in bias is used for element 25. For example, a silicon junction diode with about 0.6 volt of bias has been found to be satisfactory. With diode 19 in its cutoff condition, excess IF current overcomes the bias of diode 25 and is shunted to ground. The current through buffer amplifier 20 is thus constant at a value of $i_e+i_1$ and positive clipping takes place. The voltage at point A is only slightly changed during this operation and the impedance of the collector circuit of transistor amplifier 13 is still very low.

If the incoming current $i_{IF}$ exceeds the bias current of the clipping diodes in the negative direction, diode 18 is cut off and all excess IF current is routed to ground through auxiliary diode 26 which may be simply a fast silicon, point contact, diode. Diode 26, is normally biased in the nonconducting state during the nonclipping phase of the operation. Once again, the voltage at point B is not substantially changed as diode 18 becomes nonconducting, and the collector circuit impedance of amplifier 13 remains low. Current through buffer amplifier 20 thus remains substantially constant at $i_e-i_1$, and negative clipping takes place.

Conveniently, a low impedance ammeter 27 is connected in series with diode 26 so that retcified diode current can be used as an indication of IF signal strength. Presumably sufficient IF signal strength is maintained at all times to insure limiting action. Diode 26 acts, therefore, as a threshold device with a very steep transition reigon (clipping level) and linear transmission above the clipping level. Meter 27 will, therefore, give an extremely useful indication of the magnitude of signals in the receiver circuits. Moreover, it has been found that a skilled operator can, through an observation of meter variations, ascertain the "quality" of received signals, e.g., the extent and nature of noise impressed on the signals, or the like. Especially with a band limited signal, noise modulation of the carrier is quite evident.

To change the positive clipping level, it is necessary only to alter the bias current which holds diode 19 in the conducting state. Similarly, a change in the bias current supplied to diode 18 effects a change in the negative clipping level. For symmetrical clipping, diodes 18 and 19 must be forward biased by equal currents. Thus $$i_1=i_2-i_1 \qquad (1)$$

or $$i_2=2i_1 \qquad (2)$$

If it is assumed that the positive and negative bias potentials (+V and −V) are of equal magnitude and much greater than the voltages developed at points A, B, or C, the proper bias currents are thus established if:

$$R_1=2R_2 \qquad (3)$$

and $$R_3=\frac{1}{\frac{i_e}{V}+\frac{1}{R_1}} \qquad (4)$$

As changes in diode bias current are made, however, it is necessary to maintain the emitter current of buffer amplifier 20 at a level such that it always operates in its active conduction region. This condition is fulfilled so long as the emitter current is always greater than $i_1=V/R_1$. For symmetrical clipping, currents $i_1$, $i_2$, and $i_3$ must therefore be simultaneously adjusted. It is in accordance with the invention to subdivide resistors $R_1$, $R_2$, and $R_3$, which resistors independently control the three bias currents, according to the relation of Equations 3 and 4. Thus, resistor $R_1$ is made up of fixed resistor $R_1'$ and adjustable resistor $R_1''$. Resistor $R_2$, similarly, comprises the series combination of fixed resistor $R_1'/2$ and adjustable resistor $R_1''/2$ (Equation 3). $R_3$ is constructed according to Equation 4 and includes the series arrangement of fixed resistor $R_1'$ and adjustable resistor $R_1''$ connected in parallel with fixed resistor $R_3'$, where $R_3'=V/i_e$. With this arrangement, an adjustable resistor in each circuit controls the bias current for the respective path and, as the three resistors are adjusted in concert, the bias currents vary to alter the clipping level symmetrically. Bias currents for a wide range of clipping levels are thus maintained in their proper ratios.

It will thus be apparent that the illustrated circuit embodies certain features which act cooperatively to maintain a very low impedance for IF signal currents both in the clipping and nonclipping phase of operations. Wide band signals may thus be accommodated with very little phase delay. The auxiliary current paths through diodes 25 and 26 prevent impedance upsets, and a judicious selection of resistor values permits the clipping level to be symmetrically altered with but a single control.

The above-described arrangement is, of course, merely illustrative of the application of the principles of the invention. Numerous other arrangements may be devised by those skilled in the art without departing from the spirit and scope of the invention.

What is claimed is:

1. Current limiting apparatus which comprises low impedance amplifier means supplied with frequency modulated signal currents, low impedance buffer amplifier means, a first signal path including a pair of serially connected oppositely poled diodes extending between said amplifier means and said buffer means, means for individually biasing said diodes to conduction for signals in said first path within a preselected range of signal current magnitudes and for biasing said buffer amplifier means to conduction at a low impedance for a wide range of applied signal current magnitudes, each of said biasing means comprising a resistive network which includes an adjustable resistor connected to a source of potential, the resistance of each of said adjustable resistors being related to the resistance of the adjustable resistors in the others of said networks such that a proportional change in the resistances of all of said adjustable resistors produces a substantially equal change in the bias of each of said diodes and a proportional change in the bias of said buffer amplifier sufficient to maintain the conduction of said buffer amplifier substantially a constant, a second signal path including a diode extending between said amplifier means and a point of reference potential, a third signal path including a diode extending between the junction of said serially connecting diodes in said first signal path and a point of reference potential, said diodes in said second and said third paths being biased to nonconduction for signal currents within said preselected range of signal currents and individually to conduction for signal currents outside of said preselected range of currents, and means for simultaneously varying the resistances of said adjustable resistors proportionally, thereby to alter symmetrically the conduction characteristics of said oppositely pole diodes and to maintain the conduction level of said buffer amplifier means substantially a constant.

2. A wide band current limiter which comprises, in combination, driver amplifier means supplied with carrier signal currents, buffer amplifier means for supplying limited carrier signal currents to a utilization circuit, first and second diodes serially connected with opposite polarity between the output of said driver amplifier means and the input of said buffer amplifier means, means including a third diode for shunting current supplied to said first diode whenever said first diode is biased to nonconduction, means including a fourth diode for shunting current supplied to said second diode whenever said second diode is biased to nonconduction, first means including a source of positive potential of magnitude V and resistive means $R_1$ connected between said source and said first diode for biasing said first diode, said resistive means $R_1$ comprising tandemly connected resistors of magnitudes $R_1'$ and $R_1''$, second means including a source of positive potential of magnitude V and resistive means $R_3$ connected between said positive source and the junction of said second diode and said buffer amplifier means for biasing said second diode and said buffer, said resistive means $R_3$ comprising tandemly connected resistors of magnitudes $R_1'$ and $R_1''$ in shunt with a resistor of magnitude $R_3'$ where $R_3'$ is equal to V divided by the input current of said buffer amplifier, third means including a source of negative potential of magnitude V and resistive means $R_2$ connected between said negative source and the junction of said first and second diodes for providing a return path for bias current through said first and second diodes, said resistive means $R_2$ comprising tandemly connected resistors of magnitudes $R_1/2$ and $R_1''/2$ and means for simultaneously adjusting said resistors, respectively, of magnitudes $R_1''$ in said first baising means, $R_1''$ in said second biasing means, and $R_1''/2$ in said means for returning said bias currents, for symmetrically altering the range of conduction of said current limiter.

References Cited by the Examiner

UNITED STATES PATENTS 2,675,473 4/54 Femmer ---------------- 328—171

FOREIGN PATENTS 1,042,022 10/58 Germany.

JOHN W. HUCKERT, *Primary Examiner.*

ARTHUR GAUSS, *Examiner.*

Dedication 3,196,359.—*Adolph J. Giger*, Murray Hill, N.J. WIDE BAND-CURRENT LIMITER. Patent dated July 20, 1965. Dedication filed June 5, 1972, by the assignee, *Bell Telephone Laboratories, Incorporated.*

Hereby dedicates to the Public the entire remaining term of said patent.

[*Official Gazette January 2, 1973.*]